(12) United States Patent
Costle et al.

(10) Patent No.: US 11,794,426 B2
(45) Date of Patent: Oct. 24, 2023

(54) FLAT TIRE REPAIR DEVICE

(71) Applicant: ILLINOIS TOOL WORKS INC., Glenview, IL (US)

(72) Inventors: Carey Christopher Costle, Tucson, AZ (US); Stephen Edward Richey, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/834,376

(22) Filed: Jun. 7, 2022

(65) Prior Publication Data

US 2023/0001653 A1 Jan. 5, 2023

Related U.S. Application Data

(60) Provisional application No. 63/216,649, filed on Jun. 30, 2021.

(51) Int. Cl.
*B29C 73/16* (2006.01)
*B29L 30/00* (2006.01)

(52) U.S. Cl.
CPC ......... *B29C 73/166* (2013.01); *B29L 2030/00* (2013.01)

(58) Field of Classification Search
CPC ....... F04B 49/022; B29C 73/166; B60S 5/046
See application file for complete search history.

(56) References Cited

U.S. PATENT DOCUMENTS

| 3,718,238 A | 2/1973 | Hazard |
| 3,786,964 A | 1/1974 | Landen |
| 4,081,113 A | 3/1978 | Hazard |
| 5,104,295 A * | 4/1992 | Wong ............. B60S 5/046 73/705 |
| 5,156,853 A | 10/1992 | Werner |
| 5,381,836 A | 1/1995 | Braatz |
| 5,427,145 A | 6/1995 | Grabenkort |
| 5,687,777 A | 11/1997 | Dobson |
| D425,913 S | 5/2000 | Bonzer |
| 6,789,581 B2 | 9/2004 | Cowan |
| 7,789,110 B2 | 9/2010 | Marini |

(Continued)

FOREIGN PATENT DOCUMENTS

| CN | 102673533 A | 9/2012 |
| CN | 203752543 U | 8/2014 |

(Continued)

OTHER PUBLICATIONS

Combination of Original WO2006/038640A1 with AI translation (Year: 2023).*

(Continued)

*Primary Examiner* — Timothy P. Kelly

(74) *Attorney, Agent, or Firm* — McAndrews, Held & Malloy, Ltd.

(57) ABSTRACT

A tire repair device with an inflation compressor and a sealant material canister, and method of operation. A pressure gauge determines a tire inflation pressure, and a controller identifies a completion of a sealant injection upon a pressure drop measured at the pressure gauge. The controller is configured to automatically shut off the inflation compressor when a tire pressure meets a predetermined inflation value after the pressure drop.

20 Claims, 2 Drawing Sheets

(56) References Cited

U.S. PATENT DOCUMENTS

| | | |
|---|---|---|
| 7,798,183 B2 | 9/2010 | Cegelski |
| 7,886,783 B2 | 2/2011 | Rindy |
| 8,251,105 B2 | 8/2012 | Lolli |
| 8,251,106 B2 | 8/2012 | Lolli |
| 8,459,150 B2 | 6/2013 | Yoshida |
| 8,596,310 B2 | 12/2013 | Senno |
| 8,631,840 B2 | 1/2014 | Lolli |
| 8,752,595 B2 | 6/2014 | Marini |
| 8,857,477 B2 | 10/2014 | Lolli |
| 8,997,802 B2 | 4/2015 | Lolli |
| 9,061,471 B2 | 6/2015 | Marini |
| 9,168,798 B2 | 10/2015 | Eckhardt |
| 9,221,221 B2 | 12/2015 | Lolli |
| 9,272,587 B2 | 3/2016 | Taniguchi |
| 9,868,420 B2 | 1/2018 | Chou |
| 9,914,271 B2 | 3/2018 | Spindler |
| 10,786,958 B2 * | 9/2020 | Lam .......... B60S 5/04 |
| 10,926,495 B2 | 2/2021 | Spindler |
| 11,034,104 B2 | 6/2021 | Dowel |
| 11,046,129 B2 * | 6/2021 | Chou ............ B29C 73/025 |
| 11,135,792 B2 | 10/2021 | Lam |
| 11,400,667 B2 | 8/2022 | Hong |
| 2010/0108186 A1 | 5/2010 | Yoshida |
| 2011/0155280 A1 | 6/2011 | Eckhardt |
| 2011/0192492 A1 | 8/2011 | Kanenari |
| 2014/0209207 A1 | 7/2014 | Spindler |
| 2014/0209208 A1 | 7/2014 | Taniguchi |
| 2015/0059921 A1 | 3/2015 | Jhou |
| 2016/0271892 A1 | 9/2016 | Eckhardt |
| 2016/0288434 A1 | 10/2016 | Eckhardt |
| 2017/0072648 A1 | 3/2017 | Zaum |
| 2017/0173900 A1 | 6/2017 | Kawatani |

FOREIGN PATENT DOCUMENTS

| | | |
|---|---|---|
| CN | 204278561 U | 4/2015 |
| CN | 208452350 U | 2/2019 |
| CN | 208502970 U | 2/2019 |
| CN | 110131124 A | 8/2019 |
| DE | 10106468 A1 | 8/2002 |
| DE | 102014205067 A1 | 9/2015 |
| DE | 10 2019217775 A | 5/2021 |
| DE | 102019217775 A1 | 5/2021 |
| EP | 2 058 112 A1 | 5/2009 |
| EP | 2196305 B1 | 2/2012 |
| EP | 2295299 B1 | 7/2012 |
| EP | 2058112 B1 | 5/2015 |
| EP | 2807018 B1 | 10/2018 |
| JP | 2006103144 A | 4/2006 |
| WO | 2006038640 A1 | 4/2006 |
| WO | WO 2006038640 A1 | 4/2006 |
| WO | 2009065653 A1 | 5/2009 |

OTHER PUBLICATIONS

European Patent Office, Search Report, EPO Form 1503 03.82, European Patent Application No. EP 22 18 0606, dated Nov. 18, 2022 (8 pages).

Slime Flat Tire Repair Kit, AutoZone—Auto Parts/Suspension, Steering, Tire and Wheel/Tire Maintenance and Repair/Tire Repair Kit, Part #50122, SKU #562272 (9 pages).

* cited by examiner

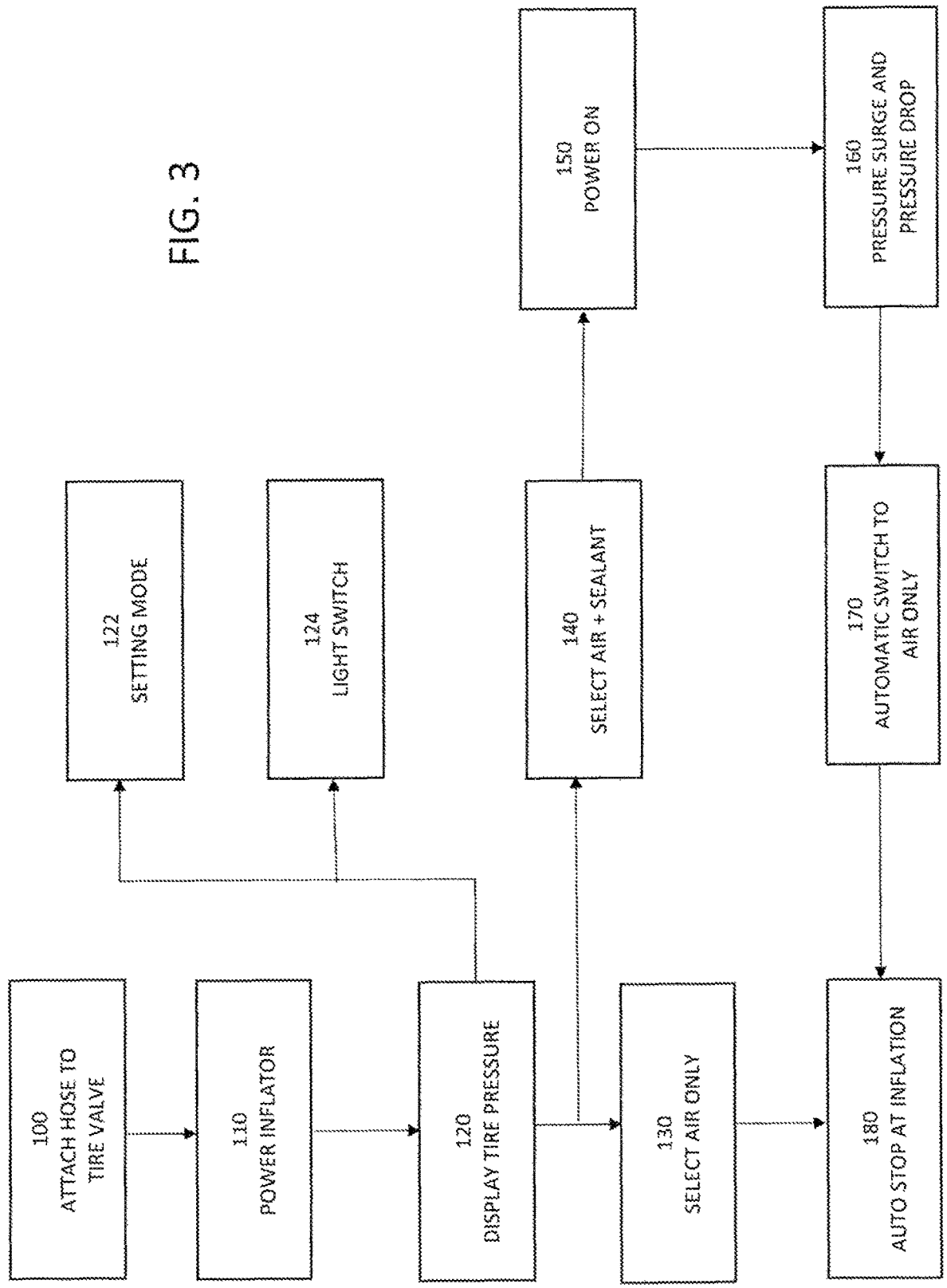

FLAT TIRE REPAIR DEVICE

CROSS-REFERENCE TO RELATED APPLICATIONS

This application claims priority to U.S. Provisional Application, Ser. No. 63/216,649, filed 30 Jun. 2021. This U.S. Provisional Application is hereby incorporated by reference herein in its entirety and are made a part hereof, including but not limited to those portions which specifically appear hereinafter.

BACKGROUND OF THE INVENTION

Field of the Invention

The invention relates to a tire repair device including a pressure source and a sealant material, and more particularly to a tire repair device including a sealant material canister and auto-shutoff technology.

Description of Prior Art

Tire repair kits are primarily used for introducing tire sealant into a punctured or otherwise flat tire for sealing the defective tire. In these devices, a compressor generally presses compressed air into a canister of tire sealant, and the tire sealant is then pumped into the defective tire via a valve. After this, the valve can be switched so that the compressor can then directly inflate the tire. Devices can pump air alone in order to inflate balls or air mattresses or performing an air pressure check.

Tire repair kits with sealant material are generally challenging to implement with automatic shutoff features. Automatic shutoff (e.g., Applicant's Inflate Right™ technology) works in that the inflator automatically turns off when a preset pressure is reached. For example, a user can set the inflator to 35 PSI, and start inflation. When the tire pressure reaches 35 PSI, the inflator automatically shuts off. In tire repair kits, the injection of the sealant into the tire results in a "pressure spike" in that the back pressure registered in the system can reach around 80 PSI immediately upon start of sealant injection. Exceeding the preset pressure value can immediately stop the inflator, rendering it impractical. Thus there is a continuing need to improve inflation devices for use with automatic shutoff.

SUMMARY OF THE INVENTION

The present invention is directed to a tire repair kit/device with automatic shutoff. The device includes a sealing material and a controller with a control algorithm that recognizes or responds to sealant pressure surges, and maintains automatic inflation through and/or after the pressure spike. The control logic allows the system to continuously check pressure to track rise and fall between set levels to read actual tire pressure at correct points in cycle, ensuring the "Inflate Right" feature is not activated or otherwise implemented until after the sealant injection is complete.

The invention includes a tire repair device comprising a hose configured to attach to a tire valve, an inflation compressor in combination with the hose and configured to provide pressurized air through the hose, a sealant material in combination with the inflation compressor and the hose, and a pressure gauge configured to determine a tire inflation pressure. A controller is configured to identify a completion of an injecting of the sealant material upon a pressure drop measured at the pressure gauge. In embodiments of this invention the controller is configured to automatically shut off the inflation compressor when a tire pressure meets a predetermined inflation value after the pressure drop. The controller is desirably configured to identify the injecting of the sealant material at a pressure surge at a predefined surge pressure (e.g., above 40-50 psi), and the pressure drop at or above a predefined post-surge pressure (e.g., 3-10 psi below the predetermined inflation value).

The predetermined inflation value is generally manually set by a user of the device. Also, the device can be operated by the user to automatically inflate the tire pressure to the predetermined inflation value without any sealant injection.

The invention further includes a tire repair device including: a hose configured to attach to a tire valve; an inflation compressor in combination with the hose and configured to provide pressurized air through the hose; a sealant material in combination with the inflation compressor and the hose; and a controller. The controller includes or implements a first operation state configured to automatically shut off the inflation compressor when a tire pressure meets a predetermined inflation value, and a second operation state to release the sealant material into the tire valve. The controller initiates or otherwise switches to the first operation state after the sealant material is released into the tire valve.

In embodiments of this invention, the controller is configured to monitor a pressure surge upon the release of the sealant, and automatically switch to the first operation state after the pressure surge. The controller desirably identifies the pressure surge at a predefined surge pressure, and switches to the second operation state at or below a predefined post-surge pressure. An exemplary predefined surge pressure is 50 psi, and an exemplary predefined post-surge pressure is 30 psi.

The invention further includes a method for inflating a tire with a tire repair device. The method includes the tire repair device receiving a predetermined inflation value from a user; the tire repair device pumping air into the tire; the tire repair device injecting a tire sealant into the tire; and the tire repair device automatically inflating the tire to the predetermined inflation value after the injecting of the tire sealant. In embodiments of this invention, the tire repair device only monitors for the predetermined inflation value after the injecting of the tire sealant.

In embodiments of this invention, when the injecting the tire sealant causes a pressure surge, the tire repair device determines a corresponding pressure drop after the injecting of the tire sealant and then automatically inflates the tire to the predetermined inflation value. The method can further include identifying the pressure surge at a predefined surge pressure, and switching to the automatically inflating the tire to the predetermined inflation value at or below a predefined post-surge pressure lower than the predefined surge pressure.

BRIEF DESCRIPTION OF THE DRAWINGS

The above-mentioned and other features and objects of this invention will be better understood from the following detailed description taken in conjunction with the drawings wherein:

FIG. 3 is an operational flow diagram for a flat tire repair kit according to a method of one embodiment of this invention.

DESCRIPTION OF PREFERRED EMBODIMENTS

Figure 1:
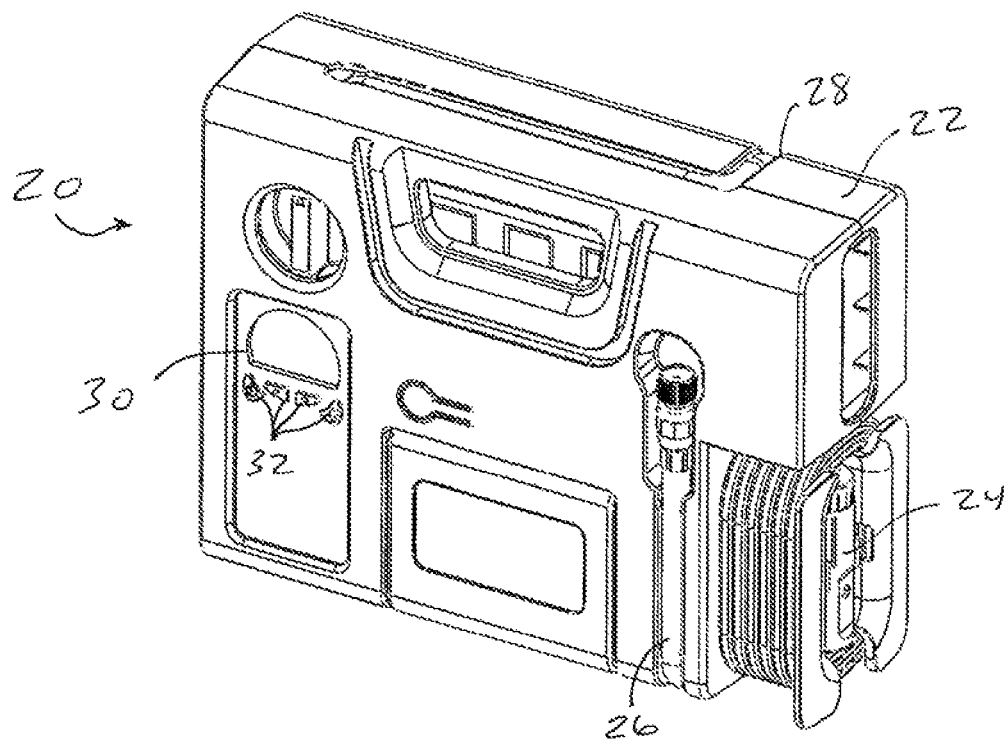
FIG. 1 is a perspective view of a flat tire repair kit according to one embodiment of this invention.

FIG. 1 shows a tire repair device 20 according to one embodiment of this invention. The device 20 includes an outer housing 22, a power cord 24, and an air/sealant dispensing hose 26. The hose 26 can connect to any standard tire valve, such as an auto tire Schrader valve. The hose 26 can optionally be wrapped around the housing 22 for storage within a hose recess 28, in any suitable arrangement depending on the shape and configuration of the housing 22.

The device 20 includes an LCD screen 30 for receiving and/or displaying pressure information. The LCD screen 30 is or is associated with a pressure gauge that measures the tire pressure via back pressure through the hose 26. Buttons 32 are provided to allow the user to set the desired inflation pressure. For example, a "+" button can increase the preset inflation pressure by, for example, 0.5 or 1.0 psi increments, and a "−" button can be used to decrease the preset inflation by a corresponding amount. During operation, the inflator introduces air to the tire until the measured pressure matches the entered preset inflation pressure from the user.

Figure 2:
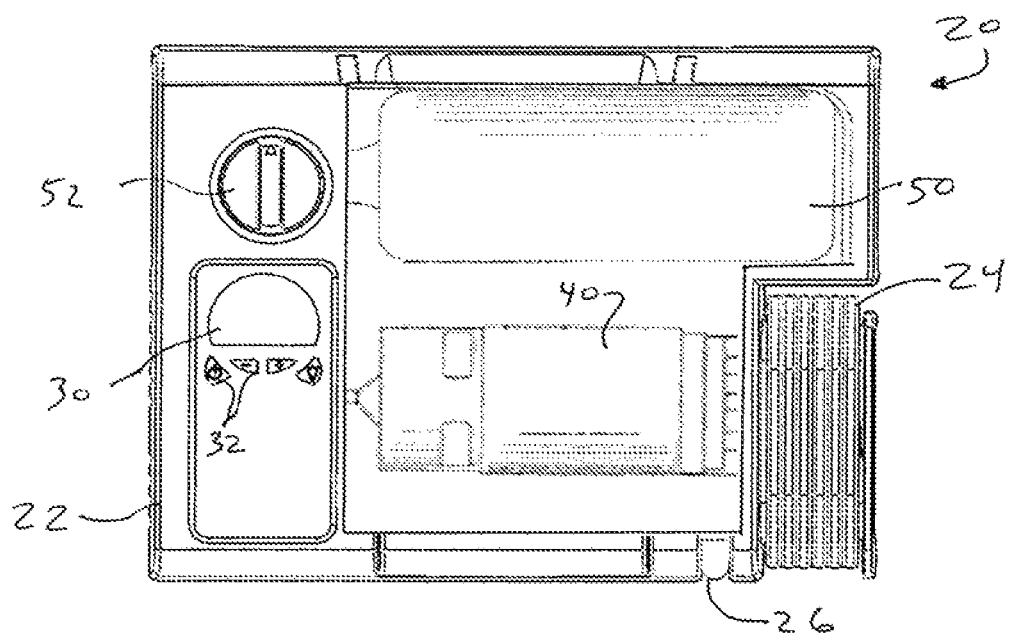
FIG. 2 is a top, partial sectional view of a flat tire repair kit according to one embodiment of this invention.

FIG. 2 shows exemplary internal components for the device 20. The device 20 includes an inflation compressor 40 in combination with the pressure gauge and LCD control screen 30, such as by a controller operating these components. The controller has any suitable processor(s) and recordable medium for implementing inflation and other features of this invention.

The device 20 further includes a sealant canister 50 enclosing a sealant material. The sealant canister 50 is connected to one or more air lines from the inflation compressor via any suitable valve. The valve can be controlled by switch 52, whereby a user can switch between an "air only" mode or an "air+sealant" mode. As shown, the pressure gauge is implemented with a digital display, and the switch 52 is an analog/mechanical switch. As will be appreciated, each of these components can be analog/mechanical or digital, depending on need. Various other internal components, such as tubing, valves, electrical connection, etc., vary depending on the particular device and are within the general skill of the compressor art.

Embodiments of this invention include a method of inflation operation, and a controller for implementing the method with the tire repair device, such as discussed above. The method is implemented by a control logic programmed into the device that will check the system inflation pressure in set intervals. Once the controller determines a pressure drop after the sealant material is injected, then the controller will start or otherwise continue automated inflation until reaching the user's preset inflation value. As an example, for a needed inflation value of 35 psi, the controller will pump air and sealant, resulting in a pressure above 50 psi (due to sealant injection). The controller will continue pumping air and monitor the pressure until the pressure falls below a second value below the preset inflation value, such as 30 psi, and then turn on or otherwise switch to the auto inflate and shut-off function of the inflator, allowing the unit to then turn off at the user's preset pressure.

FIG. 3 is a flow diagram of a method according to one embodiment of this invention. In step 100, the device hose is attached to a valve of a tire. In step 110, the device is plugged into a 12 volt accessory power outlet of the vehicle, or other equivalent power source. In stop 120, the device pressure gauge, such as LCD 30 in FIG. 1, optionally displays the current tire pressure, and then allows for entry of the desired final tire inflation pressure. Referring to box 122, and the buttons 32 in FIG. 1, pressing the "+" or "−" button will place the controller into "setting mode." Once in "setting mode", the LCD 30 flashes and then pressing the "+" or "−" button increases or decreases, respectively, the target pressure value, preferably by 0.5 psi or 1.0 psi increments. In embodiments of this invention, continuously pressing the "+" or "−" button for a given time, such as two seconds, will enter into a "fast setting mode", increasing or decreasing the rate of target pressure at an increased speed, or in larger pressure increments. The display 30 will show the final preset pressure value to which the tire will be inflated.

In box 124, an optional light switch can be operated to allow illumination for a flat tire repair. Pressing an included "light switch" button turns on an LED or equivalent. Pressing the "light switch" button again turns off the light.

In step 130, the user can optionally select a first operation state of "air only." In this operation, only air is pumped into the tire, such as where the air pressure needs to be adjusted, and no damage to the tire has occurred. When the pressure gauge measures the preset inflation value, the controller will turn off the inflation compressor, and the hose can be removed from the tire valve.

In step 140, the user selects the "air+sealant" operation state, whereby sealant will be injected into the hose and tire via the fill air from the inflation compressor. In embodiments of this invention, the "air+sealant" operation state can be selected by a manual valve lever. In other embodiments, the "air+sealant" operation state is selected digitally by pressing a switch button, such as a dedicated button, or holding a power button. Desirably, the LCD is clear on which operation state is selected. In step 150, the compressor is started, such as by pressing a start button. The LCD desirably shows pressure increases in 0.5 psi.

Step 160 reflects a pressure surge that results from the sealant material being released into the hose and tire. The controller is configured to identify a completion of sealant material injecting upon a pressure drop back to an expected pressure (e.g., between the original pressure and the desired inflation pressure) measured at the pressure gauge. When the controller identifies the pressure drop is complete, the controller is configured to switch (170) to the auto-inflate operation state and automatically shut off the inflation compressor when a tire pressure next meets the preset inflation value after the pressure drop. The value that represents the end of the pressure drop is generally below the preset pressure value, and is desirably set at a particular value or amount below the preset value, such as 5 psi. Switching to the auto-inflate mode several psi below the target value provides a buffer for any additional pressure drop while inflation commences, thus avoiding a quick inflation and shutoff before the pressure drop is actually concluded.

As an example, when the pressure gauge reaches a pressure greater than 50 psi and then drops less than 30 psi, the controller will recognize a completion of the sealant injection. In step 170, the controller then continues in or otherwise switches to an "air only" mode, until automatically stopping the compressor in step 190 at the preset pressure value. The device is then removed from the tire valve.

Thus the invention provides improved inflation logic for use in combining sealant injection with auto-shutoff inflation. The device and method of this disclosure can be implemented in any of various tire repair kits, and desirably reduces or eliminates device and/or user error.

The invention illustratively disclosed herein suitably may be practiced in the absence of any element, part, step, component, or ingredient which is not specifically disclosed herein. While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A tire repair device comprising:
   a hose configured to attach to a tire valve;
   an inflation compressor in combination with the hose and configured to provide pressurized air through the hose;
   a sealant canister in combination with the inflation compressor and the hose, wherein the sealant canister is configured to provide sealant material through the hose;
   a pressure gauge configured to determine a tire inflation pressure; and
   a controller configured to identify a completion of an injecting of the sealant material upon a pressure drop measured at the pressure gauge and, upon identifying the completion of the injecting, to provide pressurized air through the hose without the sealant material automatically.

2. The tire repair device of claim 1, wherein the controller is configured to automatically shut off the inflation compressor when the tire inflation pressure meets a predetermined inflation value after the pressure drop.

3. The tire repair device of claim 2, wherein the controller is configured to identify the injecting of the sealant material at a pressure surge at a predefined surge pressure, and the pressure drop at or below a predefined post-surge pressure.

4. The tire repair device of claim 3, wherein the predefined surge pressure is 50 psi, and the predefined post-surge pressure is 30 psi.

5. The tire repair device of claim 2, wherein the predetermined inflation value is manually set by a user of the tire repair device.

6. The tire repair device of claim 2, wherein the controller is configured to be operated by the user of the tire repair device to automatically inflate the tire until the tire inflation pressure meets the predetermined inflation value without the injecting of the sealant.

7. The tire repair device of claim 1, wherein the controller is configured to monitor a pressure surge upon the release of the sealant, and to switch off supply of the sealant material automatically after detecting the pressure surge.

8. The tire repair device of claim 7, wherein the controller is configured to identify the pressure surge at a predefined surge pressure, and to provide the pressurized air through the hose without the sealant material at a predefined post-surge pressure.

9. The tire repair device of claim 2, further comprising a screen configured to display the tire inflation pressure and the predetermined inflation value.

10. The tire repair device of claim 5, further comprising one or more buttons configured to receive one or more inputs from the user of the tire repair device to receive or set the predetermined inflation value.

11. A tire repair device for repairing and inflating a tire via a tire valve, the comprising:
    an outer housing;
    a hose configured to couple to the tire valve;
    a pressure gauge configured to determine a tire inflation pressure of the tire;
    an inflation compressor positioned in or coupled to the outer housing and configured to deliver pressurized air through the hose;
    a sealant canister positioned in or coupled to the outer housing, wherein the sealant canister is configured to supply a sealant material via the hose; and
    a controller configured to provide both the pressurized air and the sealant material through the hose until a pressure drop is identified via the pressure gauge and, upon identifying the pressure drop, to provide pressurized air through the hose without the sealant material.

12. The tire repair device of claim 11, wherein the controller is configured to monitor a pressure surge upon the release of the sealant, and to switch off supply of the sealant material automatically after detecting the pressure surge.

13. The tire repair device of claim 11, wherein the controller is configured to automatically shut off the inflation compressor when the tire inflation pressure meets a predetermined inflation value after the pressure drop.

14. The tire repair device of claim 13, wherein the controller is configured to be operated by the user of the tire repair device to automatically inflate the tire until the tire inflation pressure meets the predetermined inflation value without the injecting of the sealant.

15. The tire repair device of claim 13, further comprising a screen configured to display the tire inflation pressure and the predetermined inflation value.

16. The tire repair device of claim 13, further comprising one or more buttons configured to receive one or more inputs from the user of the tire repair device to receive or set the predetermined inflation value.

17. The tire repair device of claim 13, wherein the controller is configured to identify the injecting of the sealant material at a pressure surge at a predefined surge pressure, and the pressure drop at or below a predefined post-surge pressure.

18. The tire repair device of claim 11, wherein the inflation compressor and the sealant canister are each positioned within the outer housing and arranged parallel to one another.

19. The tire repair device of claim 11, wherein the inflation compressor defines a first major axis and the sealant canister defines a second major axis that is parallel to the first major axis.

20. A tire repair device for repairing and inflating a tire via a tire valve, the comprising:
    an outer housing;
    an inflation compressor positioned in the outer housing and configured to deliver pressurized air through a hose;
    a sealant canister positioned in or coupled to the outer housing, wherein the sealant canister is configured to supply a sealant material via the hose; and
    a controller configured to provide both the pressurized air and the sealant material through the hose until a pressure drop is identified via a pressure gauge and, upon identifying the pressure drop, to provide pressurized air through the hose without the sealant material,
    wherein the controller is configured to automatically shut off the inflation compressor when the tire inflation pressure meets a predetermined inflation value after the pressure drop, and wherein the predetermined inflation value is manually set by a user of the tire repair device via one or more buttons positioned on the outer housing.

\* \* \* \* \*